(12) United States Patent
Kalies

(10) Patent No.: US 6,994,643 B2
(45) Date of Patent: Feb. 7, 2006

(54) DRIVEN PULLEY SYSTEM WITH SPRING POSITIONER

(75) Inventor: Ken Edward Kalies, Richmond, IN (US)

(73) Assignee: Hoffco/Comet Industries, Richmond, IN (US)

(*) Notice: Subject to any disclaimer, the term of this patent is extended or adjusted under 35 U.S.C. 154(b) by 296 days.

(21) Appl. No.: 10/438,414

(22) Filed: May 15, 2003

(65) Prior Publication Data
US 2004/0229723 A1 Nov. 18, 2004

(51) Int. Cl.
F16H 53/08 (2006.01)

(52) U.S. Cl. ............................................. 474/46; 474/8
(58) Field of Classification Search ............ 474/8, 474/10, 11, 12, 14, 17, 19, 20, 21, 32, 46; 192/52, 54, 93 A
See application file for complete search history.

(56) References Cited

U.S. PATENT DOCUMENTS

| | | | |
|---|---|---|---|
| 2,155,351 A | 4/1939 | Paulus | |
| 2,612,054 A | 9/1952 | Davis | |
| 2,658,399 A * | 11/1953 | Mercier | 474/19 |
| 2,928,286 A | 3/1960 | Davis | |
| 2,987,934 A | 6/1961 | Thomas | |
| 3,103,999 A | 9/1963 | Rabinow et al. | |
| 3,545,580 A | 12/1970 | Baer | |
| 3,625,079 A | 12/1971 | Hoff | |
| 3,747,721 A | 7/1973 | Hoff | |
| 3,824,867 A | 7/1974 | Brooks | |
| 3,850,050 A | 11/1974 | Lemmens | |
| 3,895,544 A * | 7/1975 | Suzaki | 474/87 |
| 4,179,946 A | 12/1979 | Kanstoroom | |
| 4,196,641 A | 4/1980 | Vogel | |
| 4,380,444 A | 4/1983 | Dolza | |
| 4,575,363 A | 3/1986 | Burgess et al. | |
| 4,585,429 A | 4/1986 | Marier | |
| 4,969,856 A | 11/1990 | Miyata et al. | |
| 5,254,041 A | 10/1993 | Duclo | |
| RE35,617 E | 9/1997 | Krivec | |
| 5,720,681 A | 2/1998 | Benson | |
| 5,967,286 A | 10/1999 | Hokanson et al. | |
| 6,120,399 A | 9/2000 | Okeson et al. | |
| 6,149,540 A | 11/2000 | Johnson et al. | |
| 6,155,940 A | 12/2000 | Templeton | |
| 6,186,915 B1 | 2/2001 | Dietl | |
| 6,248,035 B1 | 6/2001 | Bartlett | |
| 6,336,878 B1 | 1/2002 | Ehrlich et al. | |

(Continued)

FOREIGN PATENT DOCUMENTS

JP 01093656 A * 4/1989

OTHER PUBLICATIONS

Duane Watt, "Found, The Missing Half of the Secondary Clutch", SnowTech, Sep. 1997, pp114-119.
Three images of driven pulley system (before Jan. 17, 2003).

Primary Examiner—Vicky A. Johnson
(74) Attorney, Agent, or Firm—Barnes & Thornburg LLP

(57) ABSTRACT

A driven pulley system for use in a torque converter of a vehicle is disclosed. The driven pulley system includes relatively axially movable first and second flanges arranged to squeeze a belt of the torque converter therebetween. The driven pulley system also includes a spring positioner that includes a worm gear and a worm arranged to rotate the worm gear to wind or unwind a spring to cause relative axial movement between the first and second flanges to adjust the squeeze of the belt by the first and second flanges.

22 Claims, 8 Drawing Sheets

U.S. PATENT DOCUMENTS

| | | | |
|---|---|---|---|
| 6,342,024 | B1 | 1/2002 | Walter et al. |
| 6,354,419 | B1 | 3/2002 | Dalbiez et al. |
| 6,502,479 | B1 | 1/2003 | Lee |
| 2001/0049312 | A1 | 12/2001 | Warner et al. |
| 2002/0019280 | A1 | 2/2002 | Brown |
| 2002/0032088 | A1 | 3/2002 | Korenjak et al. |
| 2002/0065156 | A1 | 5/2002 | Younggren et al. |
| 2002/0119846 | A1 | 8/2002 | Kitai et al. |
| 2002/0155909 | A1 * | 10/2002 | Roby ............... 474/14 |
| 2002/0160867 | A1 | 10/2002 | Katou |
| 2004/0229724 | A1 * | 11/2004 | Kailes ............... 474/19 |

* cited by examiner

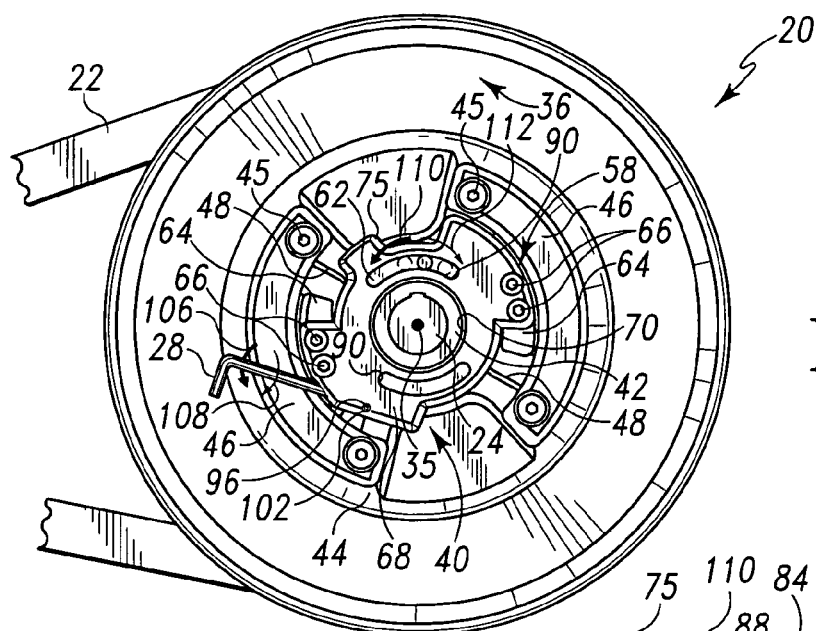
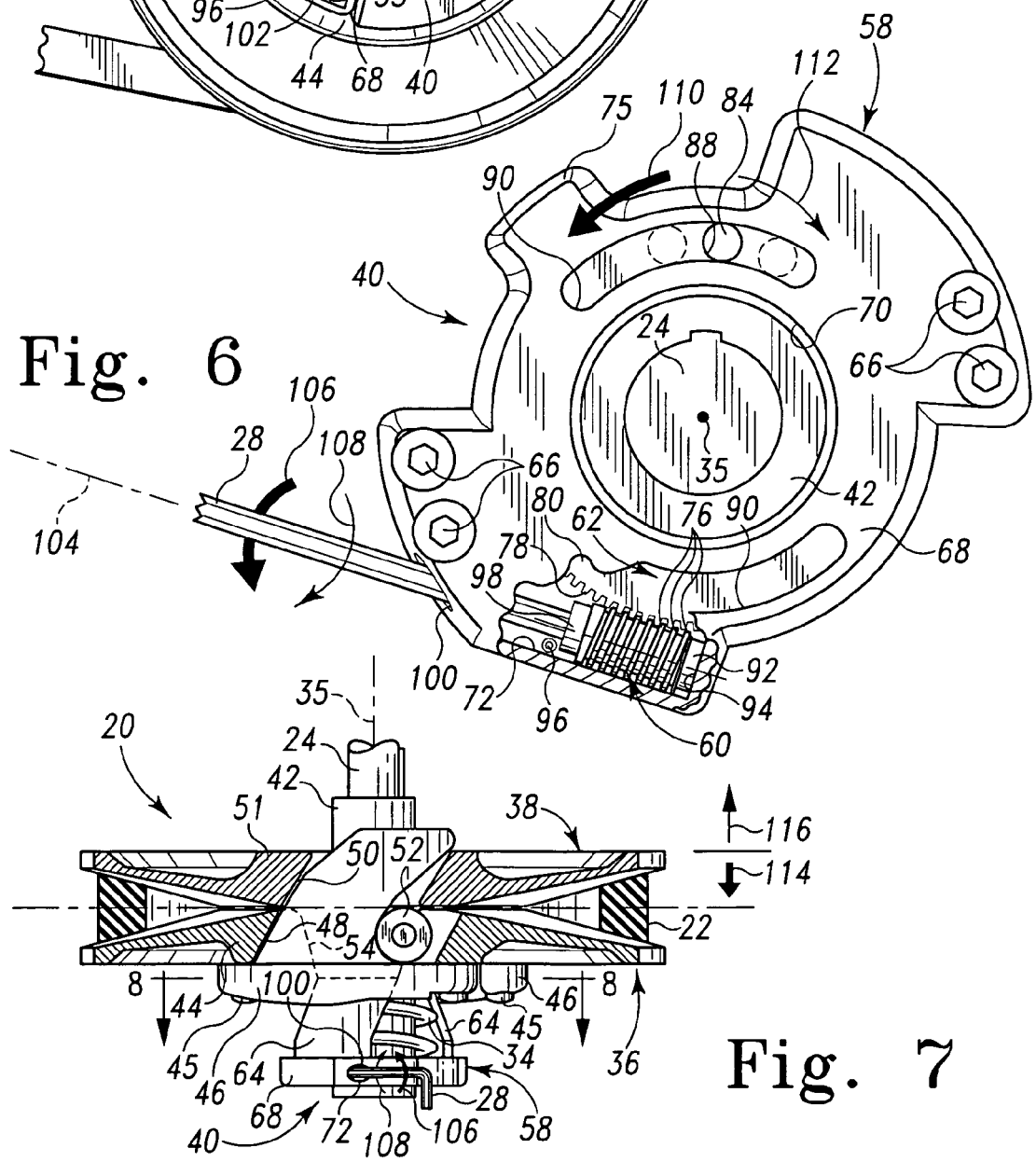
Fig. 5
Fig. 6
Fig. 7

DRIVEN PULLEY SYSTEM WITH SPRING POSITIONER

BACKGROUND

The present disclosure relates to torque converters and more particularly to driven pulley systems for use in torque converters.

Torque converters are used on vehicles to promote vehicle engine performance. A torque converter is continuously variable in response to both engine speed (i.e., engine rpm) and torque (i.e., rotational resistance) encountered by a rotatable ground-engaging element (e.g., snowmobile track, wheel) of the vehicle.

A torque converter typically includes a belt trained about a driver pulley system and a driven pulley system. The driver pulley system is adjustable in response to engine speed. The driven pulley system is adjustable in response to torque. Adjustment of the driver and driven pulley systems varies the "shift ratio" of the torque converter to allow the engine to operate at a desired engine speed.

SUMMARY

According to the present disclosure, a driven pulley system is disclosed for use in a torque converter of a vehicle. The driven pulley system comprises a motion-transmitting fixed unit and a belt-tensioning movable unit. The fixed unit is arranged to be fixed to a rotatable output shaft of the vehicle for rotation with the output shaft to transmit motion between the output shaft and a belt included in the torque converter. The movable unit is arranged for movement relative to the fixed unit to tension the belt to promote engine speed responsiveness and torque responsiveness of the torque converter.

The fixed unit includes a fixed flange and the movable unit includes a movable flange. The fixed and movable flanges receive the belt therebetween and cooperate to squeeze the belt.

The movable unit includes a spring positioner for use with a spring included in the driven pulley system. The spring has a fixed spring end arranged for movement with the fixed unit and a movable spring end arranged for movement with the movable unit. The spring positioner includes a worm and a worm gear. Rotation of the worm rotates the worm gear to rotate the movable spring end relative to the fixed spring end to wind or unwind the spring somewhat. Such winding or unwinding of the spring causes axial movement of the spring positioner which, in turn, moves the movable flange axially away from or toward the fixed flange to adjust the squeeze of the belt by the fixed and movable flanges. Belt squeeze adjustability is useful in controlling maximum engine speed.

Additional features and advantages of the disclosure will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which:

FIG. 5 is a front elevation view of the driven pulley system of FIG. 3 showing the tool inserted into the cavity for rotation about a tool axis in either a squeeze-increasing direction (indicated by a thick arrow) or a squeeze-decreasing direction (indicated by a thin arrow) to rotate a movable spring end that is included in the spring and is visible through an arcuate window formed in the frame about a driven rotation axis in either (1) a spring-unwinding, squeeze-increasing direction (indicated by a thick arrow also) to unwind the spring somewhat to increase belt squeeze in response to rotation of the tool in its squeeze-increasing direction or (2) a spring-winding, squeeze-decreasing direction (indicated by a thin arrow also) to wind the spring somewhat to decrease belt squeeze in response to rotation of the tool in its squeeze-decreasing direction;

FIG. 6 is an enlarged front elevation view of the tool and spring positioner of FIG. 5, with portions broken away, showing the tool rotating a worm mounted in the cavity formed in the support frame to rotate a worm gear to rotate the movable spring end between exemplary positions shown in phantom;

FIG. 7 is a side elevation view of the driven pulley system of FIG. 5, with portions broken away, showing the belt squeezed between the fixed flange (located below the belt) and the movable flange (located above the belt) and showing that the movable flange is arranged to move axially outwardly toward the fixed flange in a squeeze-increasing direction (indicated by a thick arrow) to increase belt squeeze in response to rotation of the tool and movable spring end in their squeeze-increasing directions and to move axially inwardly away from the fixed flange in a squeeze-decreasing direction (indicated by a thin arrow 0 to decrease belt squeeze in reponse to rotation of the tool and movable spring end in their squeeze-decreasing directions;

DETAILED DESCRIPTION

Figure 1:
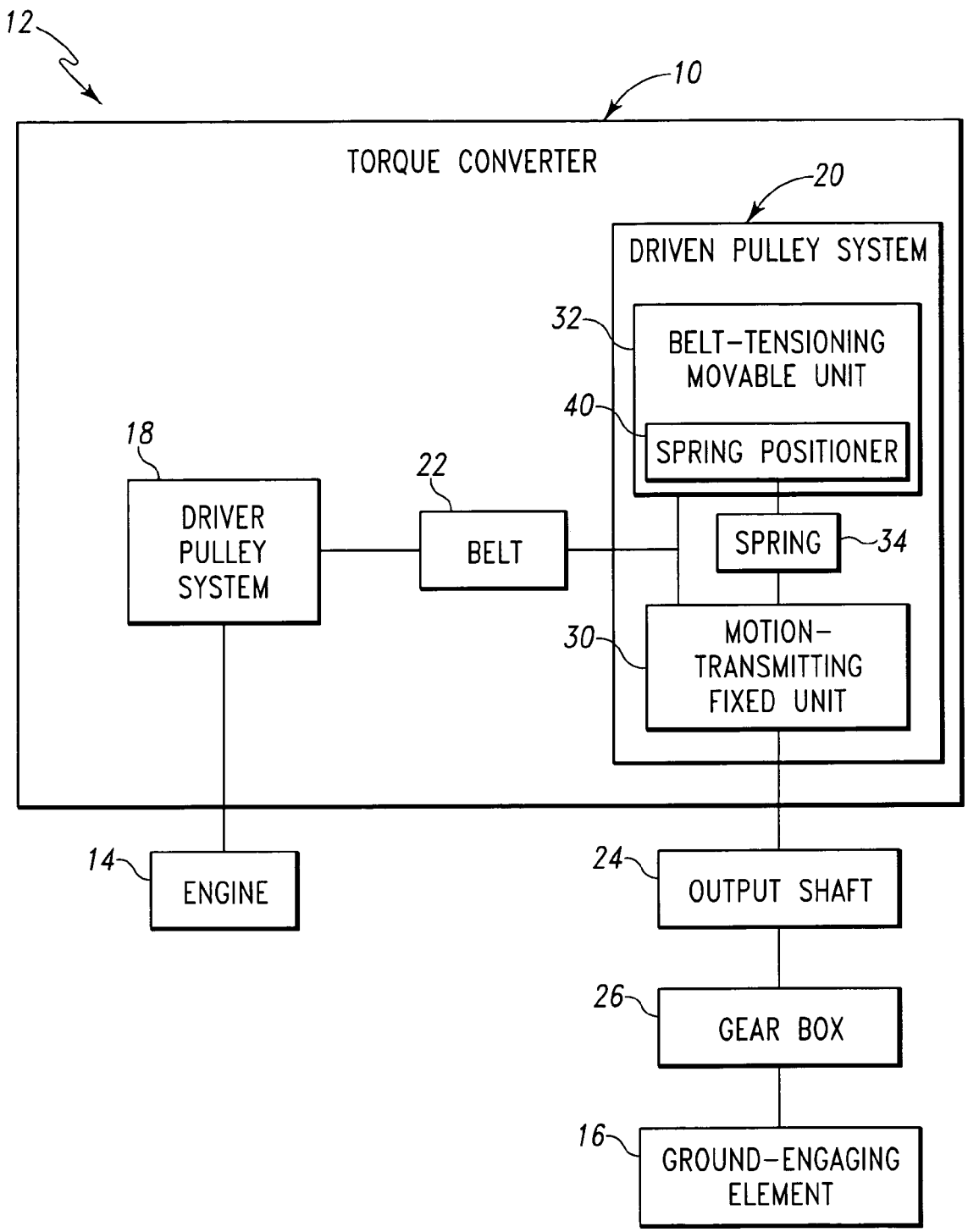
FIG. 1 is a diagrammatic view showing components of a vehicle including a torque converter that is continuously variable in response to vehicle engine speed and torque experienced by a vehicle ground-engaging element and showing the torque converter including a belt interconnecting a driver pulley system coupled to the vehicle engine and a driven pulley system coupled to an output shaft which is connected to the ground-engaging element via a gear box.
Figure 2:
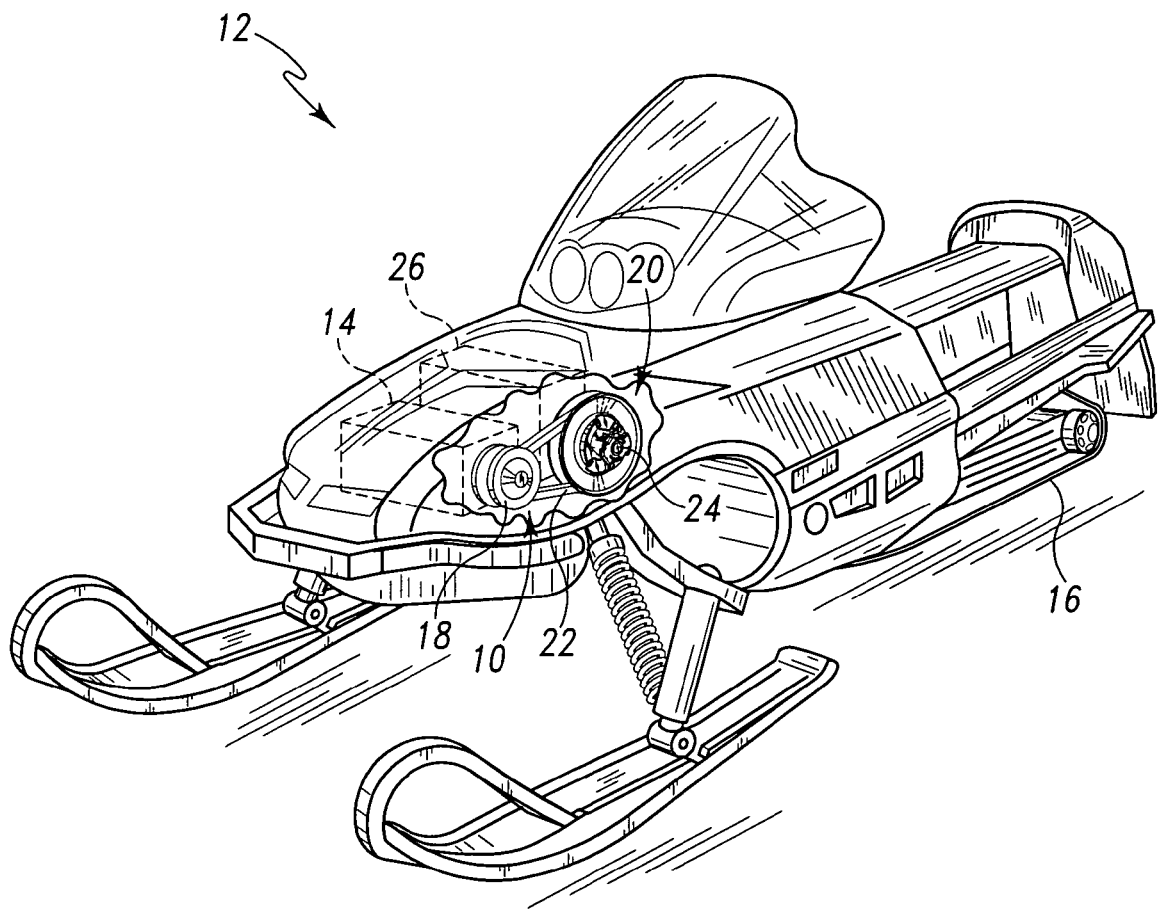
FIG. 2 is a perspective view of a snowmobile, with portions broken away, showing the snowmobile including a torque converter having a belt trained about a driver pulley system (on the left) and a driven pulley system (on the right)

A torque converter 10 for use in a vehicle 12 is shown in FIGS. 1 and 2. In the illustrated embodiment, the vehicle 12 is a snowmobile. It is within the scope of this disclosure for the torque converter 10 to be used with other types of vehicles such as utility vehicles, all-terrain vehicles, motorcycles, mini-bikes, and go-karts, to name a few.

The torque converter 10 is continuously responsive to the speed of an engine 14 of the vehicle 12 and to torque encountered by a ground-engaging element 16 (e.g., snowmobile track as in illustrated embodiment, wheel) of the vehicle 12. The torque converter 10 is arranged to "upshift" to convert increased engine speed into an increased rotation rate of the element 16 and thus an increase in vehicle speed and is arranged to "downshift" to convert decreased engine speed into a decreased rotation rate of the element 16 and thus a decrease in vehicle speed. If the element 16 encounters increased torque (such as when going uphill), the torque converter 10 downshifts to allow the engine to operate at a desired engine speed.

The torque converter 10 includes a driver pulley system 18, a driven pulley system 20, and a belt 22 (e.g., a V-belt) trained about the systems 18, 20, as shown in FIGS. 1 and 2. Driver pulley system 18 is coupled to a drive shaft of engine 14 for rotation therewith. An exemplary driver pulley system which may be used as system 18 is disclosed in U.S. Pat. No. 6,155,940, the disclosure of which is hereby expressly incorporated by reference herein. Driven pulley system 20 is coupled to an output shaft 24 (e.g., jackshaft) for transmission of motion between the belt 22 and the output shaft 24. The output shaft 24 operates a gear box 26 for rotation of the ground-engaging element 16.

The driven pulley system 20 is arranged to squeeze the belt 22. The driven pulley system 20 is adjustable to change the extent to which it squeezes the belt 22. A tool 28 (e.g., hexagon wrench) shown in FIG. 3 may be used to adjust belt squeeze as discussed in more detail herein.

Belt squeeze may be adjusted to control maximum engine speed. It may be desirable, for example, for the engine 14 to operate in a higher performance mode, such as for racing of the vehicle 12. To operate in a higher performance mode, the engine 14 needs to be able to operate at a higher engine speed. The driven pulley system 20 may be adjusted to increase the belt squeeze to increase the maximum speed at which the engine 14 is allowed to operate. On the other hand, it may be desirable for the engine 14 to operate in a lower performance mode. In such a case, the driven pulley system 20 may be adjusted to decrease the belt squeeze to decrease the maximum speed at which the engine 14 is allowed to operate.

Belt squeeze may also be adjusted to account for wear on the belt. A newer belt may require less belt squeeze than a worn belt. As a belt wears, it tends to "glaze" or become more slick. A worn belt could slip on the driven pulley system 20 if belt squeeze were not adjusted. Thus, to avoid belt slippage by a worn belt, belt squeeze may be increased.

Figure 4:
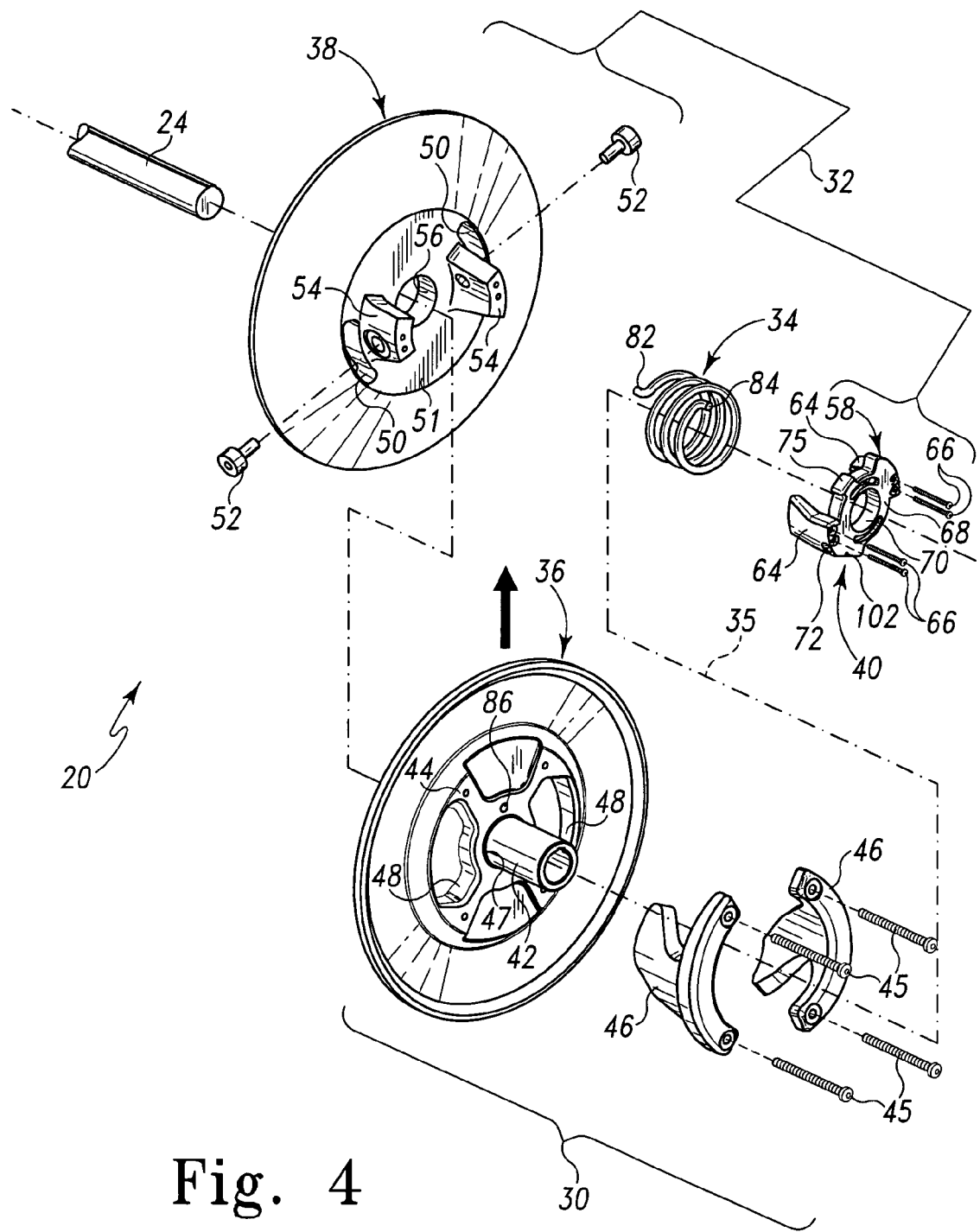
FIG. 4 is an exploded perspective view showing most of the components of the driven pulley system grouped into one of (1) a motion-transmitting fixed unit (at bottom of page) to be fixed to the output shaft (at top left of page) of the snowmobile for rotation therewith to transmit motion between the output shaft and the belt and (2) a belt-tensioning movable unit (at top of page) to be mounted for movement relative to the fixed unit to tension the belt during operation of the torque converter and showing a spring to be mounted to the fixed and movable units.

The driven pulley system 20 includes a motion-transmitting fixed unit 30, a belt-tensioning movable unit 32, and a coil spring 34, as shown in FIGS. 1 and 4. The fixed unit 30 is fixed to the output shaft 24 for rotation therewith about a driven rotation axis 35 and is arranged to transmit motion between the belt 22 and the output shaft 24. The movable unit 32 is arranged for axial movement and rotation relative to the fixed unit 30 to tension the belt 22 to promote responsiveness of the torque converter 10 and to promote operation of the engine 14 at a desired engine speed. The fixed unit 30 includes a fixed flange 36 and the movable unit 32 includes a movable flange 38 axially and rotatably movable relative to the fixed flange 36. The flanges 36, 38 cooperate to squeeze the belt 22 therebetween.

The spring 34 provides the belt-squeezing force for the fixed and movable flanges units 30, 32 to squeeze the belt 22. A spring positioner 40 shown in FIGS. 1, 3, and 4–7 and included in the movable unit 32 is arranged to adjust the spring 34 to adjust belt squeeze by the flanges 36, 38 in response to operation of the tool 28, as discussed in more detail herein. The spring positioner 40 may be referred to as means for relatively axially moving the flanges 36, 38 to adjust the squeeze of the belt 22 thereby.

Components of the fixed unit 30 are shown in FIG. 4. The fixed unit 30 includes a shaft-receiving sleeve 42, the annular fixed flange 36, and a pair of cams 46. The sleeve 42 is keyed to the output shaft 24 so as to be fixed thereto for rotation therewith. The sleeve 42 extends into a central hole 47 formed in the fixed flange 36. The fixed flange 36 is fixed to the sleeve 42 for rotation therewith. Each cam 46 is arranged to be removably mounted to a fixed flange hub portion 44 by fasteners 45 to extend through a fixed flange channel 48 formed in the hub portion 44 into a movable flange channel 50 formed in a movable flange hub portion 51 of the movable flange 38.

Components of the movable unit 32 are shown in FIG. 4. The movable unit 32 includes the annular movable flange 38, the spring positioner 40, a cam follower 52 for each cam 46, and a cam-follower mount 54 for each cam follower 52. The sleeve 42 extends through a central hole 56 formed in the movable flange hub portion 51 such that the movable flange 38 is journalled on the sleeve 42 for rotation relative thereto. The cam-follower mounts 54 are fixed to the movable flange hub portion 51. Each cam follower 52 is mounted to its cam-follower mount 54 for engagement with a cam 46. The cam follower 52 is arranged to follow the cam 46 to cause the movable flange 38 to rotate relative to the fixed flange 36 to tension the belt 22 upon axial movement of the movable flange 38 away from the fixed flange 36 due to radially inward movement of the belt 22 between the flanges 36, 38. In the illustrated embodiment, each cam follower 52 is a roller and the cam-follower mounts 54 are towers formed monolithically with the movable flange hub portion 62.

The spring positioner 40 is mounted to the cam-follower mounts 66 for movement therewith, as shown in FIG. 7. The spring positioner 40 is arranged to position the spring 34 between the spring positioner 40 and the fixed flange 36.

The spring positioner 40 includes a support frame 58 shown in FIGS. 3–13 and a worm system mounted to the support frame 58. The worm system includes a worm 60 and an annular worm gear 62 and is used to wind or unwind the spring 34 somewhat to cause the movable flange 38 to move axially relative to the fixed flange 36 to adjust the squeeze of the belt 22 by the flanges 36, 38, as described in more detail herein.

The support frame 58 includes a pair of legs 64, as shown in FIGS. 3–5 and 7–13. Each leg 64 is mounted to a cam-follower mount 54 by a pair of fasteners 66. The legs 64 and cam-follower mounts 54 access one another through the fixed flange channels 48. The legs 64 and cam-follower mounts 54 are arranged for movement in the fixed flange channels 48 as the movable unit 32 moves relative to the fixed unit 30. The cam-follower mounts 54 are positioned in the channels 48 when the flanges 36, 38 are closest to one another due to the driven pulley system 20 being at rest or idling, as shown in FIG. 7. As the driven pulley system 20 begins to operate and the flanges 36, 38 move axially away from one another due to radially inward movement of the belt 22, the cam-follower mounts 54 withdraw from the channels 48 and the legs 64 move into the channels 48.

The support frame includes an annular worm system support plate 68, as shown, for example in FIGS. 3–13. The plate 68 is mounted to the legs 64. A central hole 70 formed in the plate 68 is arranged to receive the sleeve 42 and output shaft 24.

The worm 60 and worm gear 62 are mounted to the plate 68. The plate 68 includes a worm cavity 72 and an annular gear-receiving channel 74. The worm 60 is positioned in the worm cavity 72 for rotation therein. The worm gear 62 is positioned in the gear-receiving channel 74 for rotation therein. The worm cavity 72 is positioned radially outwardly from the gear-receiving channel 74. As such, the worm 60 is positioned radially outwardly from the worm gear 62. The plate 68 is formed to include a counterweight 75 to counterbalance the worm 60.

The worm 60 engages the worm gear 62 for rotation thereof, as shown in FIG. 6. The worm 60 includes threads 76 that engage teeth 78 formed in a radially outer portion 80 of the worm gear 62.

Figure 3:
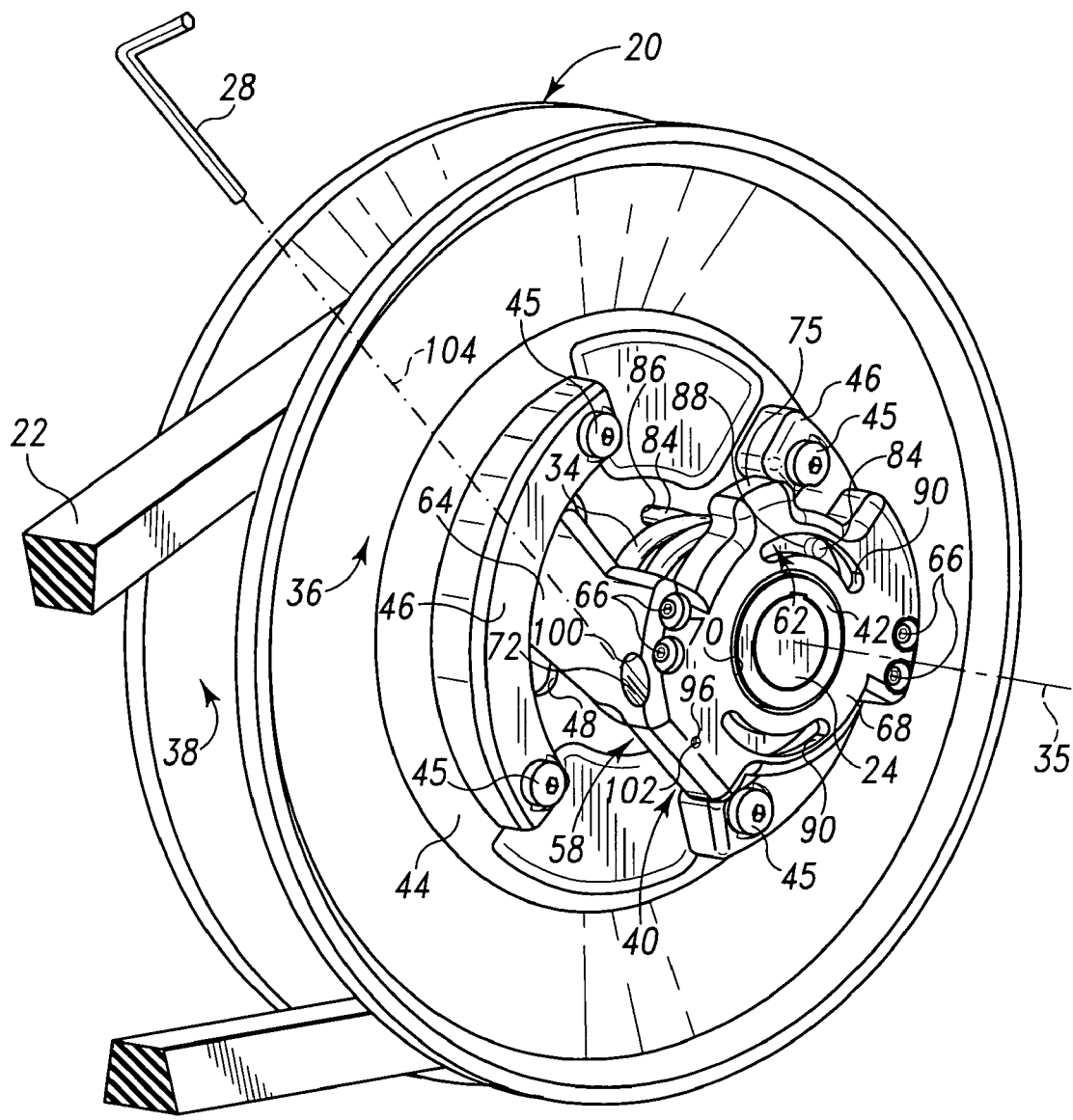
FIG. 3 is an enlarged perspective view showing the driven pulley system and a tool aligned for insertion into a cavity formed in support frame of a spring positioner included in the driven pulley system to adjust the squeeze of a belt between a fixed flange (located in front of the belt) and a movable flange (located behind the belt)

The spring 34 is mounted to the fixed flange 36 and the worm gear 62, as shown in FIG. 3. The spring 34 includes a fixed spring end 82 and a movable spring end 84. The fixed spring end 82 is received by a fixed spring end receiver 86 included in the fixed flange hub portion 44. In the illustrated embodiment, the fixed spring end receiver 86 is a hole formed in the hub portion 44. The movable spring end 84 is received by a movable spring end receiver 88 included in the worm gear 62. The movable spring end receiver 88 is a hole formed in the worm gear 62. The movable spring end 84 is arranged to be visible through one of two arcuate windows 90 formed in the plate 68.

The spring 34 is preloaded in compression and torsion. The spring 34 is preloaded in compression to push the spring positioner 40 axially outwardly away from the fixed flange 36 so as to bias the movable flange 38 toward the fixed flange 36 and to bias the belt 22 radially outwardly on the flanges 36, 38. As such, the spring 34 push the worm gear 62 axially outwardly against the plate 68 in the gear-receiving channel 74. The spring 34 is preloaded in torsion in that it is normally wound up somewhat. As such, the spring 34 biases the worm gear 62 against the worm 60 so as to bias an inner end 92 of the worm 60 against a worm bearing surface 94 that is shown in FIG. 6 and included in the worm cavity 72. In this way, the worm 60 and the worm gear 62 are retained in place.

The spring positioner 40 includes a worm retainer 96 that is shown in FIG. 6 and arranged to retain the worm 60 in the worm cavity 72 in the event that the spring 34 is unwound so as to completely lose its torsion preload. The worm retainer 96 is positioned between an outer end 98 of the worm 60 and a tool access opening 100 into the worm cavity 72 for engagement with the outer end 98 to block egress of the worm 60 from the cavity 72 through the opening 100. In the illustrated embodiment, the worm retainer 96 is a dowel pin press fit into a retainer-receiving socket 102 formed in the plate 68.

The spring positioner 40 is used to adjust belt squeeze, as shown in FIGS. 5–7. The tool 28 is inserted through the tool access opening 100 into the worm cavity 72 and into engagement with the outer end 98 of the worm 60. The tool 28 is rotatable about a tool axis 104 in either a squeeze-increasing direction 106 or a squeeze-decreasing direction 108. Rotation of the tool 28 in the squeeze-increasing direction 106 rotates the worm 60 in the squeeze-increasing direction 106. Rotation of the tool 28 in the squeeze-decreasing direction 108 rotates the worm 60 in the squeeze-decreasing direction 108.

Rotation of the worm 60 rotates the worm gear 62 and the movable spring end 84 coupled thereto, as shown in FIG. 6. Rotation of the worm 60 in the squeeze-increasing direction 106 rotates the worm gear 62 and the movable spring end 84 in a spring-unwinding, squeeze-increasing direction 110 to rotate the movable spring end 84 relative to the fixed spring end 82 to unwind the spring 34 somewhat. Rotation of the worm 60 in the squeeze-increasing direction 108 rotates the worm gear 62 and the movable spring end 84 in a spring-winding, squeeze-decreasing direction 112 to rotate the movable spring end 84 relative to the fixed spring end 82 to wind the spring 34 somewhat. The windows 90 allow a person using the tool 28 to see movement of the movable spring end 84.

Winding or unwinding the spring 34 causes the spring positioner 40 to move axially relative to the fixed flange 36. The spring positioner 40 moves axially outwardly away from the fixed flange 36 when the spring 34 is unwound in the spring-unwinding, squeeze-increasing direction 110. The spring positioner 40 moves axially inwardly toward the fixed flange 36 when the spring 34 is wound in the spring-winding, squeeze-decreasing direction 112.

Axial movement of the spring positioner 40 relative to the fixed flange 36 moves the movable flange 38 axially relative to the fixed flange 36, as shown in FIG. 7. The movable flange 38 moves axially outwardly toward the fixed flange 36 in a squeeze-increasing direction 114 to increase the squeeze of the belt 22 between the flanges 36, 38 when the spring positioner 40 moves axially outwardly. The movable flange 38 moves axially inwardly away from the fixed flange 36 in a squeeze-decreasing direction 116 to decrease the squeeze of the belt 22 between the flanges 36, 38 when the spring positioner 40 moves axially inwardly.

Belt squeeze adjustment affects radial movement of the belt 22 between the flanges 36, 38. Increasing belt squeeze makes it more difficult for the belt 22 to move radially inwardly on the driven pulley system 20 which, in turn, makes it more difficult for the belt 22 to move radially outwardly on the driver pulley system 18. With respect to engine performance, this allows the speed of the engine 14 to increase more readily to achieve higher engine performance. Decreasing belt squeeze makes it easier for the belt 22 to move radially inwardly on the driven pulley system 20 which, in turn, makes it easier for the belt 2 to move radially outwardly on the driver pulley system 18. In this way, maximum engine speed can be restricted. Use of the worm 60 and worm gear 62 allows precision belt squeeze adjustment and thus precision adjustment of the maximum engine speed.

During operation of the torque converter 10, centrifugal forces on the spring 34 may tend to cause out-of-balance, radial movement of the spring 34 off center from the driven rotation axis 35. The spring positioner 40 includes a spring-centering device 118 shown in FIGS. 8, 9, 12, and 13 and arranged to engage an outer diameter portion 120 of the spring 34 to limit such out-of-balance, radial movement of the spring 34 to center the spring 34 on the driven rotation axis 35. The spring-centering device may also be referred to as spring-centering means.

The spring-centering device 118 includes at least one spring-centering rib 122, as shown in FIGS. 8, 9, 12, and 13. In the illustrated embodiment, there are two axially extending spring-centering ribs 122 mounted to a radially inner surface 124 of each leg 64. The spring-centering ribs 122 are parallel to one another and are positioned radially outwardly from the spring 34 for engagement with the outer diameter portion 120.

Figure 8:
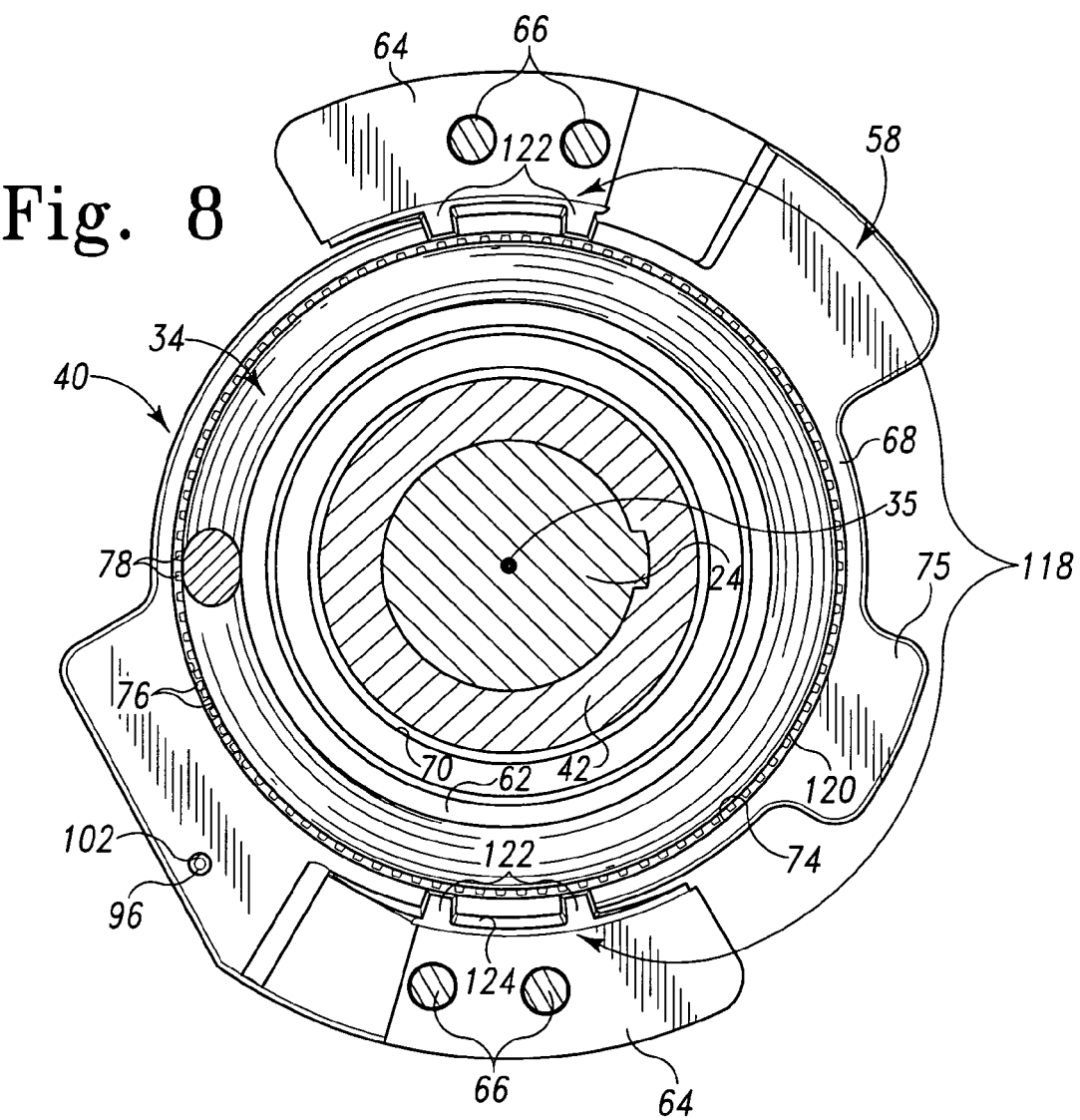
FIG. 8 is a sectional view taken along lines 8–8 of FIG. 7 showing the spring positioned between a pair of legs included in the support frame and showing a spring-centering device in the form of a pair of spring-centering ribs mounted on each leg for engagement with an outer diameter portion of the spring to limit out-of-balance, radial movement of the spring due to centrifugal forces on the spring to center the spring generally on the driven rotation axis.

There is normally a small clearance between the ribs 122 and the outer diameter portion 120, as shown in FIG. 8. When the engine 14 is at rest or idling, the clearance is about 0.02 inch. The clearance may increase to about 0.03 inch as engine speed increases and the spring 34 winds up.

Figure 9:
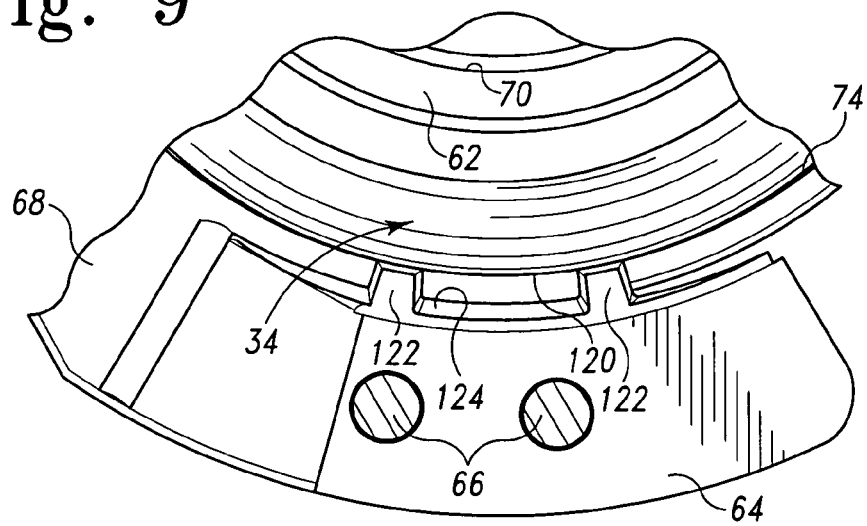
FIG. 9 is an enlarged view of a detail of FIG. 8 now showing engagement between the outer diameter portion of the spring and the two spring-centering ribs on one of the frame legs to center the spring generally on the driven rotation axis.
Figure 10:
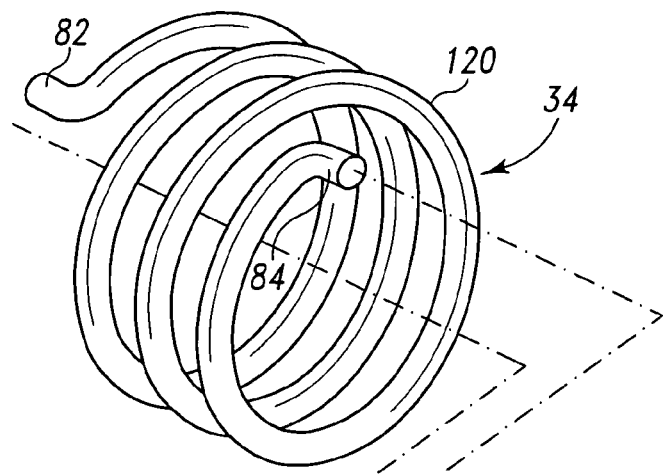
FIG. 10 is an enlarged exploded perspective view showing the spring and the spring positioner which includes, from left to right, the worm gear, the worm, the support frame, a number of fasteners for mounting the support frame, and a worm retainer.
Figure 10:
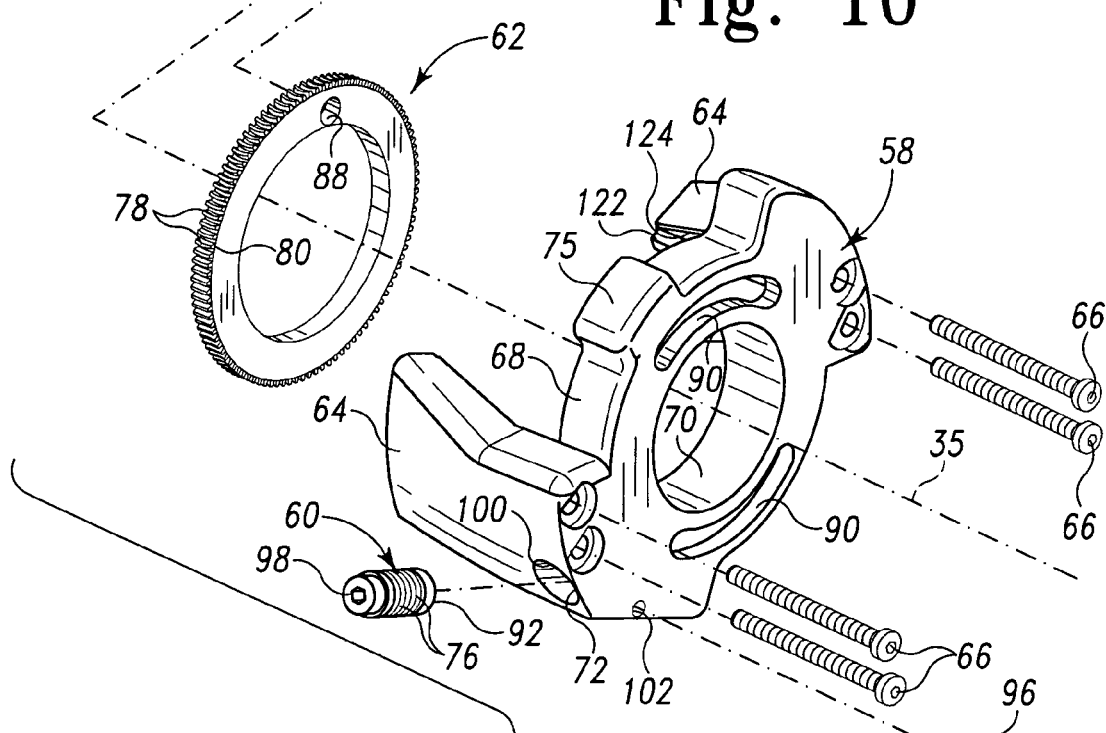
Figure 11:
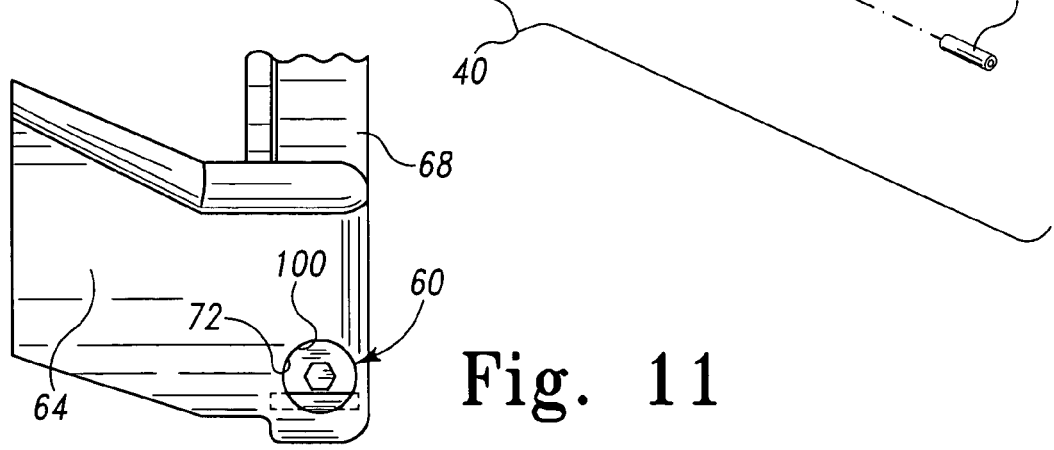
FIG. 11 is an enlarged elevation view, with portions broken away, showing the worm retainer positioned in front of the worm in the cavity to retain the worm therein.
Figure 12:
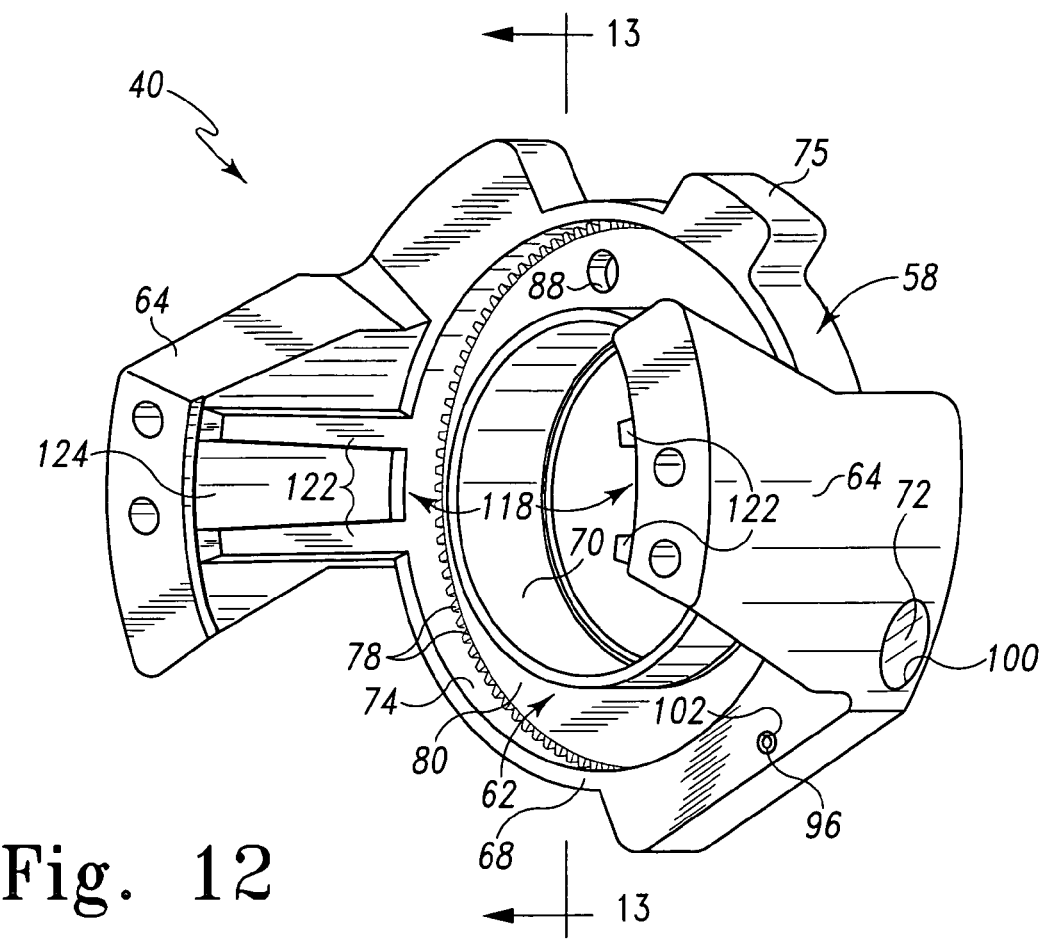
FIG. 12 is a rear perspective view of the spring positioner showing the worm gear located in an annular gear-receiving channel formed in the support frame and showing one of the legs with a pair of axially extending spring-centering ribs mounted thereto.
Figure 13:
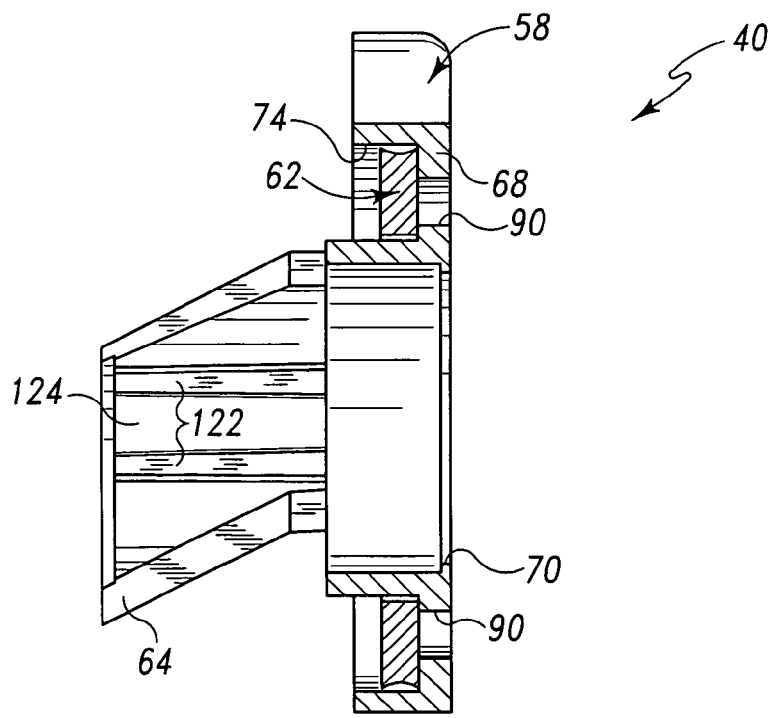
FIG. 13 is a sectional view taken along lines 13–13 of FIG. 12.

There are times, however, when the spring 34 may shift radially due to centrifugal forces on the spring 34, as shown in FIG. 9. The ribs 122 are arranged to engage the outer diameter portion 120 to limit such radial movement of the spring 34 so that the spring 34 remains generally centered on the driven rotation axis 35.

What is claimed is:

1. A driven pulley system for use in a torque converter, the driven pulley system comprising
    movable first and second flanges arranged to squeeze a belt of the torque converter between the first and second flanges and one of said flanges axially movable relative to the other,
    a spring fixedly coupled to the flanges, and
    means for relatively axially moving the one of said flanges to adjust the squeeze of the belt by the first and second flanges, the moving means including a worm gear and a worm arranged to rotate the worm gear to wind or unwind the spring to cause relative axial movement between the first and second flanges.

2. The driven pulley system of claim 1, wherein the spring includes relatively movable first and second spring ends and the worm gear is coupled to the first spring end to rotate the first spring end relative to the second spring end.

3. The driven pulley system of claim 1, wherein the worm gear includes teeth formed in a radially outer portion of the worm gear and the worm is positioned radially outwardly from the worm gear and includes threads that engage the teeth to rotate the worm gear.

4. The driven pulley system of claim 1, further comprising a cam, a cam-follower mount fixed to the first flange, and a cam follower that is mounted to the cam-follower mount and arranged to follow the cam, wherein the moving means includes a support frame, the worm and the worm gear are mounted to the support frame, and the support frame is mounted to the cam-follower mount.

5. The driven pulley system of claim 4, wherein the second flange includes a channel and at least one of the cam-follower mount and the support frame extends into the channel.

6. The driven pulley system of claim 1, further comprising spring-centering means for engaging an outer diameter portion of the spring to limit radial movement of the spring to center the spring generally on a rotation axis about which the spring rotates, and wherein the spring-centering means is mounted to the moving means.

7. A driven pulley system for use in a torque converter of a vehicle, the driven pulley system comprising
    a motion-transmitting fixed unit arranged to be fixed to a rotatable output shaft of the vehicle for rotation therewith to transmit motion between the output shaft and a belt included in the torque converter, the fixed unit including a fixed flange,
    a belt-tensioning movable unit arranged for movement relative to the fixed unit, the movable unit including a spring positioner and a movable flange arranged for movement with the spring positioner, the fixed and movable flanges being arranged to receive the belt therebetween to squeeze the belt, and
    a spring including a fixed spring end arranged for movement with the fixed unit and a movable spring end arranged for movement with the movable unit, the spring positioner including a rotatable worm and a rotatable worm gear, the spring positioner being arranged such that rotation of the worm rotates the worm gear to rotate the movable spring end relative to the fixed spring end to cause axial movement of the spring positioner to move the movable flange axially relative to the fixed flange to adjust the squeeze of the belt by the fixed and movable flanges.

8. The driven pulley system of claim 7, wherein the worm is arranged to rotate about a first axis and the worm gear is arranged to rotate about a second axis different from the first axis when the worm is rotated about the first axis.

9. The driven pulley system of claim 7, wherein the worm gear includes teeth formed in a radially outer portion of the worm gear and the worm is positioned radially outwardly from the worm gear and includes threads that engage the teeth to rotate the worm gear.

10. The driven pulley system of claim 7, wherein the spring positioner includes a support frame and the worm and the worm gear are mounted to the support frame.

11. The driven pulley system of claim 10, wherein the support frame includes a worm cavity and the worm is positioned in the worm cavity.

12. The driven pulley system of claim 11, wherein the worm cavity includes a worm bearing surface and the spring is arranged to be loaded in torsion to cause the worm gear to bias an end of the worm into engagement with the worm bearing surface.

13. The driven pulley system of claim 12, wherein the spring positioner includes a worm retainer that is positioned in the cavity and arranged to engage the worm to retain the worm in the worm cavity.

14. The driven pulley system of claim 11, wherein the worm gear is annular and the support frame includes an annular gear-receiving channel that receives the worm gear and is positioned radially inwardly from the worm cavity.

15. The driven pulley system of claim 10, wherein the worm gear is annular and the support frame includes an annular gear-receiving channel receiving the worm gear.

16. The driven pulley system of claim 7, wherein the worm gear includes a spring end receiver receiving the movable spring end.

17. A driven pulley system for use in a torque converter, the driven pulley system comprising
   a fixed flange arranged to be fixed to a rotatable output shaft of the vehicle for rotation therewith,
   a movable flange arranged for movement relative to the fixed flange when the fixed flange is fixed to the output shaft, the fixed and movable flanges being arranged to receive therebetween a belt included in the torque converter,
   a spring fixedly coupled to the flanges arranged to rotate about a rotation axis, the spring including an outer diameter portion, the spring including a fixed spring end arranged for movement with the fixed flange and a movable spring end arranged for movement with the movable flange, the movable spring end movable about the rotational axis with respect to the fixed spring end, and
   a spring-centering device coupled to the movable flange for movement therewith relative to the fixed flange and arranged to engage the outer diameter portion to limit radial movement of the spring to center the spring generally on the rotation axis.

18. The driven pulley system of claim 17, wherein the spring-centering device includes an axially extending centering rib arranged to engage the outer diameter portion.

19. The driven pulley system of claim 17, further comprising a spring positioner, wherein the spring positioner is arranged to position the spring between the spring positioner and the first flange, and the spring-centering device is included in the spring positioner.

20. The driven pulley system of claim 19, wherein the spring positioner includes a an axially extending leg and the spring-centering device includes an axially extending centering rib is mounted to the leg.

21. The driven pulley system of claim 20, further comprising a cam, a cam-follower mount fixed to the second flange, and a cam follower mounted to the cam-follower mount and arranged to follow the cam, the leg is mounted to the cam-follower mount, and the first flange includes a channel into which at least one of the cam-follower mount and leg extends.

22. The driven pulley system of claim 20, wherein the spring positioner includes an axially extending second leg, the spring-centering device includes another axially extending centering rib mounted to the second leg and arranged to engage the outer diameter portion, and the spring-centering ribs are parallel to one another.

* * * * *